T. H. PARVIN.
VINEYARD PLOW.
APPLICATION FILED NOV. 21, 1911.
1,033,728.
Patented July 23, 1912.
2 SHEETS—SHEET 1.
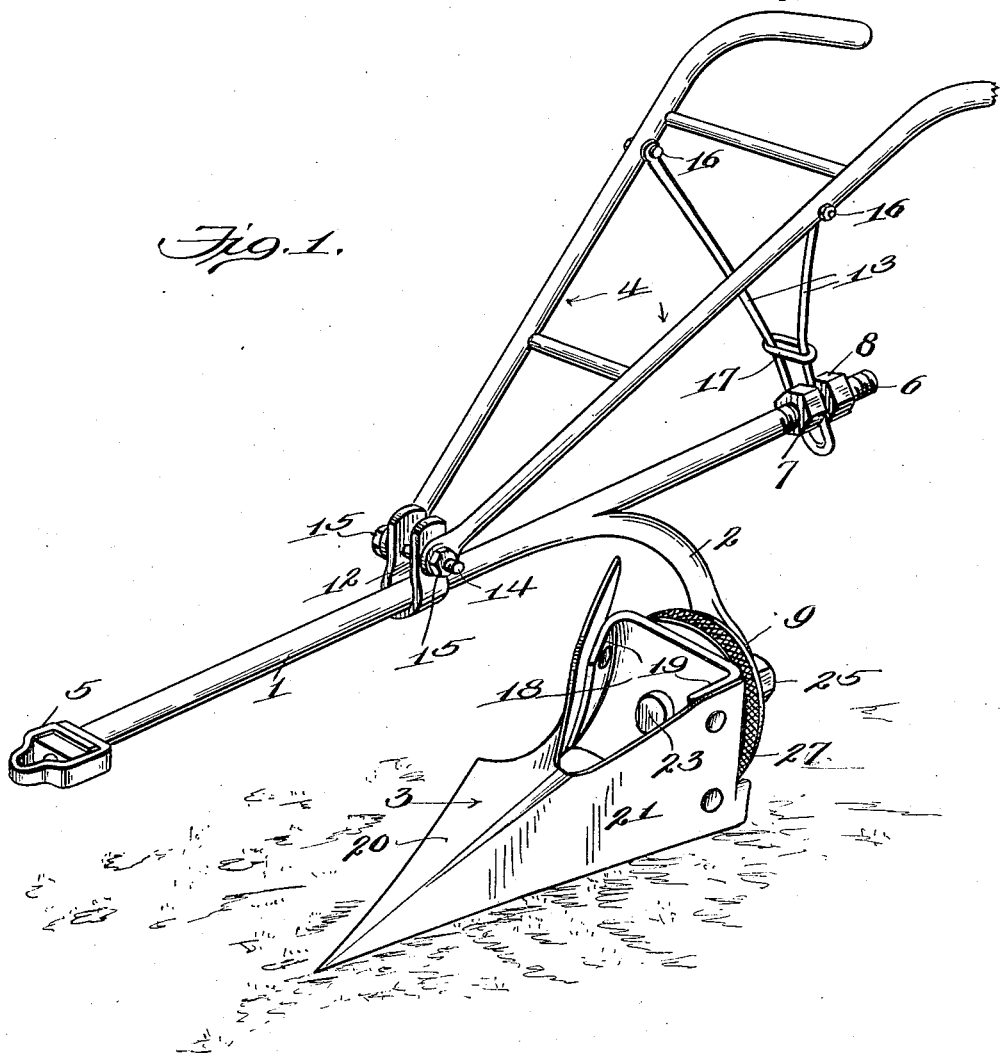
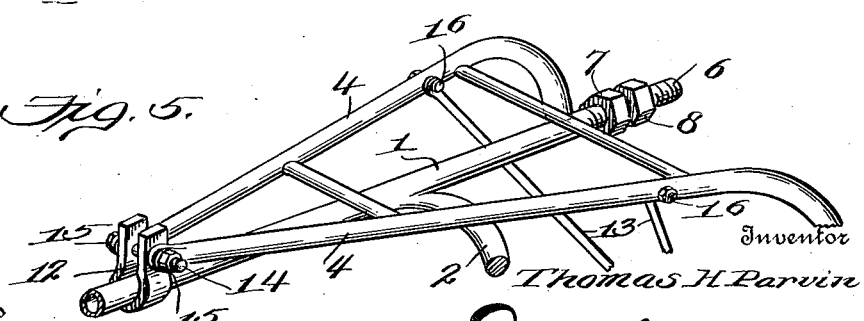

T. H. PARVIN.
VINEYARD PLOW.
APPLICATION FILED NOV. 21, 1911.
1,033,728.
Patented July 23, 1912.
2 SHEETS—SHEET 2.
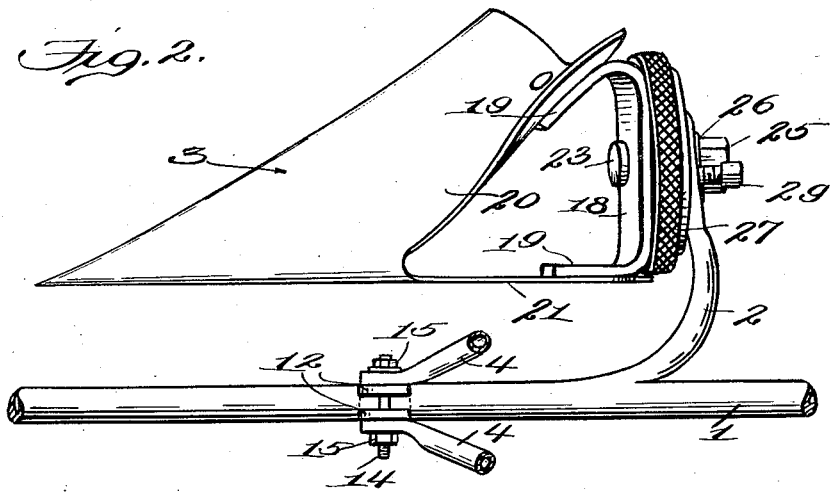
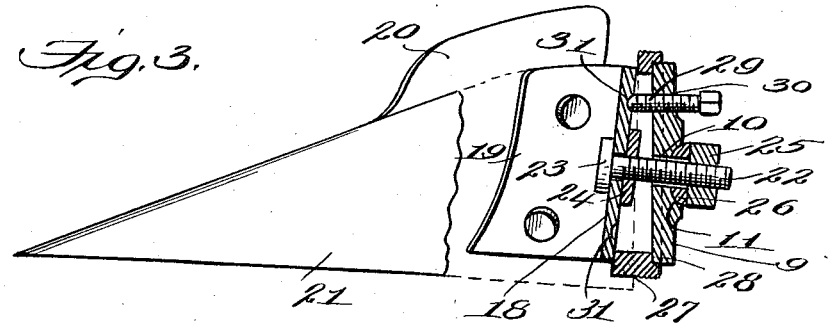
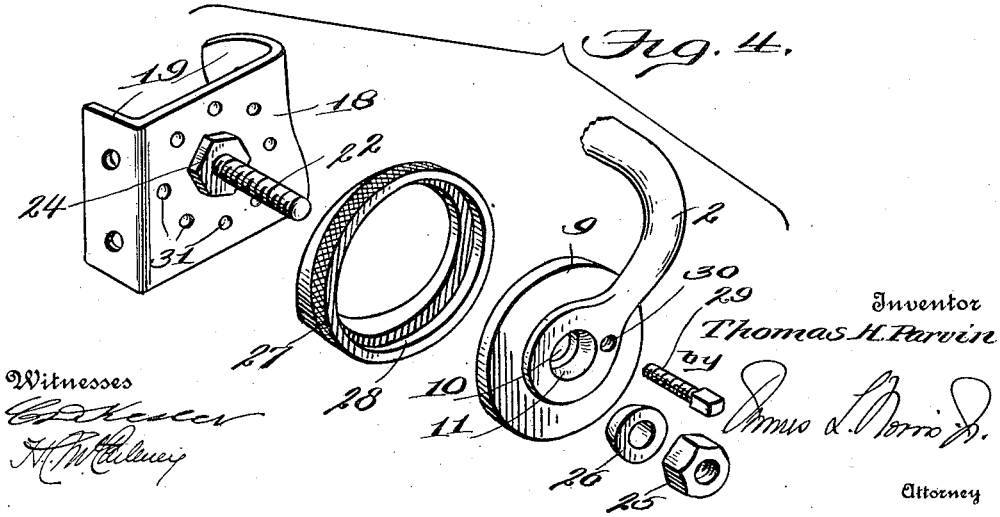
Inventor
Thomas H. Parvin
Witnesses
Attorney

UNITED STATES PATENT OFFICE.

THOMAS H. PARVIN, OF CARMI, ILLINOIS.

VINEYARD-PLOW.

1,033,728.  Specification of Letters Patent.  Patented July 23, 1912.

Application filed November 21, 1911. Serial No. 661,592.

*To all whom it may concern:*

Be it known that I, THOMAS H. PARVIN, a citizen of the United States, residing at Carmi, in the county of White and State of Illinois, have invented new and useful Improvements in Vineyard-Plows, of which the following is a specification.

The present invention relates to improvements in plows, and more particularly in that type of plow which is designed for use in cultivating vineyards.

It resides, briefly, in the production of a plow wherein the share, or plow proper, is adapted to be rocked upon its support, so as to lift or depress its point and to incline the same either toward or from the beam; wherein the beam itself may be shifted laterally to either side of or above the share; and wherein the handles may be shifted in a similar manner relative to the beam, and may, also, be swung downwardly against the latter, to permit the plow to be packed into a comparatively small space for shipment.

An embodiment of the invention is illustrated in the accompanying drawings, whereof—

Figure 1 is a perspective view of the improved plow complete; Fig. 2 is a fragmental plan view, showing the beam at the opposite side of the share from that depicted in Fig. 1; Fig. 3 is a side elevation of the share, with the supporting and adjusting mechanism thereof in section; Fig. 4 is a detached perspective view of the parts of said mechanism; and Fig. 5 is a fragmental perspective view, showing the handles folded against the beam.

The plow, as shown in said drawings, consists of the following main parts, which are, or may be, more or less conventional in shape: namely, the beam 1, standard 2, share 3, and handles 4. In the construction illustrated, the beam is in the form of a tubular metal bar carrying at its front end a rotatable clevis 5, and having a threaded rear end 6, upon which latter are mounted a pair of nuts 7 and 8. The standard 2 is preferably made integral with the beam and in the form of a curved arm thereof, said standard terminating at its free end in a disk-like enlargement or head 9 provided with an axial passage 10 whose rear portion 11 is likewise enlarged and cupped or concaved.

The handles 4, as originally stated, are so connected to the beam as to enable them to be swung laterally thereupon in either direction and, also, to be folded toward and from the same. Accordingly, there may be utilized a U-shaped spring clip 12, which straddles the beam and is free to swing thereon to either side, and a depending substantially V-shaped brace 13 whose contracted lower portion also straddles said beam and is frictionally engaged upon opposite sides by the two binding nuts 7 and 8. The free end portions of the arms of clip 12 are connected by a threaded cross-pin 14, upon the projecting ends of which the handles are loosely pivoted at their lower ends, the aforesaid pin ends carrying binding nuts 15 that are adapted to be tightened against the handle ends and serve, also, to regulate the tension of the clip arms upon the beam. The free upper ends of the brace arms are pivoted upon cross-pins 16 set into the handles adjacent the curved gripping portions of the latter, spreading of said arms being prevented by a suitable link, strap or like element 17.

To provide for the requisite adjustments of the plow share 3, that element is furnished with a vertically-disposed cross-plate 18 which is located at the rear thereof and constitutes one of the parts of the combined supporting and adjusting mechanism above mentioned. Said plate is provided with forwardly bent vertical side flanges 19 that are bolted to the rear portions of the mold-board and landside members 20 and 21 of the share, and with a centrally-located threaded bolt 22; this bolt may be detachably connected to the cross-plate, and, in such case, is held in place in substantially horizontal position by means of its head 23 and a binding nut 24 that engage the opposite faces of said plate. Bolt 22 projects rearwardly through the passage 10 in head 9 and carries on its outer end a nut 25 adapted to be tightened against the flat face of a plano-convex rocking washer 26 that fits in the cupped portion 11 of said passage, the diameter of the bolt being sufficiently less than those of the passage and the axial opening in the washer to permit a slight play of said bolt when the rocking of the share takes place, as hereinafter described. The afore-mentioned rocking movement of the share is effected by means of a rotatable operating member 27, here shown as in the form of a cam ring, that is interposed between plate 18 and head 9 and is provided at its rear side with an interiorly-located circumferential seat 28 which receives said head; (see Figs. 3 and 4). This ring is held against displacement by the action of nut 25 and washer 26, and of bolt 22 whereon they are mounted, the arrangement of these parts being such that when said ring is turned the contact of its "high" part against plate 18 will, as it moves, rock the latter, and with it the share, either side wise or up or down, according to the direction in which the ring is rotated. During the movements of the share, the bolt 22, which is attached to plate 18, will rock therewith in passage 10 and will produce a similar rocking movement of washer 26 in the cup or socket 11. When once adjusted, the share and beam may be held in position by a suitable retaining device, as, for example, a screw 29 that is passed through a threaded opening 30 located in head 9 at one side of passage 10, the inner end of said screw being designed to seat interchangeably in a circular series of recesses 31 formed in the rear face of plate 18.

From the foregoing, it will be seen that when the proper parts have been loosened, the beam may be swung to a position directly above the share or at either side thereof, without changing the position of the share, owing to the loose fit of head 9 in its seat 28; also, that the handles are susceptible of a lateral swinging movement relative to said beam, for purposes of adjustment, and, in addition, can be folded toward and from the same, and flat thereagainst, (for storage or shipping purposes, by first removing the rear nut 8 and then swinging brace 13 first upwardly to disengage its constricted portions from the beam and then downwardly to permit the beam end to pass between the divergent upper portions of its arms, as depicted in Fig. 5); and, finally, that the point of the share may be raised or lowered or shifted to either side, without entailing any adjustment of the beam or handles unless so desired. The several adjustments are dependent, of course, upon the character of the particular plowing operation to be undertaken, as will be understood, and are believed to require no separate description or explanation.

I claim as my invention:

1. In a plow, the combination, with a beam, and a standard; of a share; and a means of pivotal connection between the standard and the share to enable the beam to be swung laterally to either side of said share or above the same, said means having incorporated therein a member for rocking the share to adjust the direction of its point and which is operable in any position of the beam with relation to the share.

2. In a plow, the combination, with a beam, and a standard having a rigid connection at one end with said beam and provided at its other end with a head; of a share; and a member directly associated with said share for rocking the same, to adjust the direction of the point thereof, said member being provided with a seat wherein said head rotatably fits, to permit said beam to be swung laterally to either side of said share or above the same.

3. In a plow, the combination, with a beam and a standard; of a share; and a rotatable member directly associated with said share for rocking the same, to adjust the direction of the point thereof, said standard having a pivotal connection with said member to permit said beam to be swung laterally to either side of said share or above the same.

4. In a plow, the combination, with a beam, and a standard having a rigid connection at one end with said beam and provided at its other end with a head; of a share; and a rotatable member directly associated with said share for rocking the same, to adjust the direction of the point thereof, said member being provided with a seat wherein said head rotatably fits, to permit said beam to be swung laterally to either side of said share or above the same.

5. In a plow, the combination, with a beam, and a standard connected thereto and provided with a terminal head; of a share; a cross-piece connected to the rear portion of said share; and a member directly associated with said cross-piece and provided with a seat wherein said head rotatably fits, to permit said beam to be swung laterally to either side of said share or above the same.

6. In a plow, the combination, with a beam, and a standard connected thereto and provided with a terminal head; of a share; a cross-piece connected to the rear portion of said share; a member directly associated with said cross-piece and provided with a seat wherein said head rotatably fits, to permit said beam to be swung laterally to either side of said share or above the same; and means for retaining said beam in adjusted position relative to said share.

7. In a plow, the combination, with a beam, and a standard connected thereto and provided with a terminal head; of a share; a cross-piece connected to the rear portion of said share; a member directly associated with said cross-piece and provided with a seat wherein said head rotatably fits, to permit said beam to be swung laterally to either side of said share or above the same; and a retaining member removably engaged with said cross-piece and the first-named member for holding said beam in adjusted position relative to said share.

8. In a plow, the combination with a beam and a standard connected thereto and provided with a terminal head having an opening therethrough; of a share; a cross-piece connected to the rear portion of said share and provided with a circular series of recesses; a member associated directly with said cross-piece and having a seat wherein said head rotatably fits, to permit said beam to be swung laterally to either side of said share, or above the same; and a retaining member inserted through said opening and adapted to project at its inner end into one of said recesses, to hold said beam in adjusted position relative to said share.

9. In a plow, the combination, with a beam and a standard connected thereto and provided with a terminal head; of a share; a cross-piece connected to the rear portion of said share; and a rotatable cam directly associated with said share for rocking the latter, to adjust the direction of its point; said cam being provided with a seat wherein said head rotatably fits, to permit said beam to be swung laterally to either side of said share or above the same.

10. In a plow, the combination, with a share; of a beam; a standard having a rigid connection at one end with said beam and a pivotal connection at the other end with said share, to permit said beam to be swung laterally to either side of said share or above the same; a pair of handles pivotally connected at their lower ends to said beam; and a brace connecting the upper portions of said handles and said beam and adapted to turn upon the latter, whereby said handles may be maintained in a vertical plane irrespective of the position of the beam.

11. In a plow, the combination of a beam; a standard rigidly connected thereto at one end and provided at its other end with a head; a rocking share connected to said head; and a rotatable member interposed between said head and share and arranged to act upon the latter during its rotation to adjust the direction of its point, said member being provided with a seat in which said head rotatably fits, whereby said beam may be swung laterally to either side of said share or above the same.

In testimony whereof I have hereunto set my hand in presence of two subscribing witnesses.

THOMAS H. PARVIN.

Witnesses:
WILLIAM POYNTON,
MONROE NORRELL.

---

Copies of this patent may be obtained for five cents each, by addressing the "Commissioner of Patents, Washington, D. C."